United States Patent
Park et al.

(10) Patent No.: US 7,969,913 B2
(45) Date of Patent: Jun. 28, 2011

(54) LOCALIZATION APPARATUS FOR RECOGNIZING LOCATION OF NODE IN SENSOR NETWORK AND METHOD THEREOF

(75) Inventors: Jong-Jun Park, Gyeongsan-si (KR); Jong-Oh Lee, Daejeon (KR); Sun-Joong Kim, Daejeon (KR); Cheol-Sig Pyo, Daejeon (KR); Jong-Suk Chae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 963 days.

(21) Appl. No.: 11/851,370

(22) Filed: Sep. 6, 2007

(65) Prior Publication Data

US 2008/0080441 A1  Apr. 3, 2008

(30) Foreign Application Priority Data

Sep. 29, 2006 (KR) ........................ 10-2006-0095567

(51) Int. Cl.
*H04L 12/28* (2006.01)
(52) U.S. Cl. ...................................... 370/255; 370/338
(58) Field of Classification Search .................. 370/252, 370/254, 255, 256, 338; 455/440, 456, 456.1; 701/207, 214, 300
See application file for complete search history.

(56) References Cited

U.S. PATENT DOCUMENTS

| | | | |
|---|---|---|---|
| 4,665,404 A * | 5/1987 | Christy et al. | 342/463 |
| 6,011,974 A * | 1/2000 | Cedervall et al. | 455/456.4 |
| 6,990,080 B2 | 1/2006 | Bahl et al. | |
| 6,990,428 B1 | 1/2006 | Kaiser et al. | |
| 7,236,128 B2 * | 6/2007 | Sugar et al. | 342/465 |
| 7,295,533 B2 * | 11/2007 | Alicherry et al. | 370/328 |
| 2003/0117966 A1 * | 6/2003 | Chen | 370/255 |
| 2004/0082341 A1 | 4/2004 | Stanforth | |
| 2005/0030904 A1 * | 2/2005 | Oom Temudo de Castro et al. | 370/252 |
| 2005/0131635 A1 | 6/2005 | Myllymaki et al. | |
| 2005/0233748 A1 * | 10/2005 | Robinson et al. | 455/440 |
| 2006/0217127 A1 * | 9/2006 | Drane et al. | 455/456.1 |

FOREIGN PATENT DOCUMENTS

| | | |
|---|---|---|
| JP | 07-181242 | 7/1995 |
| JP | 2005-184727 | 7/2005 |
| KR | 1020000047296 A | 7/2000 |
| KR | 1020050065389 A | 6/2005 |
| KR | 1020050118695 A | 12/2005 |

* cited by examiner

*Primary Examiner* — Andrew Lai

(57) ABSTRACT

Provided are a localization apparatus for recognizing a location of a node in a sensor network and a method thereof. The method includes the steps of: a) selecting reference nodes from a plurality of anchor nodes to be used for triangulation; and b) obtaining location information of a target node by performing triangulation using the selected reference node, wherein in the step a), the reference nodes are selected by removing anchor nodes having obstacle factor from a plurality of the anchor nodes where the obstacle factor causes error in a distance measured by the target node.

13 Claims, 6 Drawing Sheets

| Node | Location data | Distance data |
|---|---|---|
| Node3 | $(X_3, Y_3)$ | $d_3$ |
| Node5 | $(X_5, Y_5)$ | $d_5$ |
| Node6 | $(X_6, Y_6)$ | $d_6$ |
| ... | ... | ... |
| Nodem | $(X_m, Y_m)$ | $d_m$ |

FIG. 9

| | 910 | 920 |
|---|---|---|
| | Node | Location data |
| | Node3 | $(X_1, Y_1)$ |
| | Node5 | $(X_2, Y_2)$ |
| | Node6 | $(X_3, Y_3)$ |
| | ... | ... |
| | Noden | $(X_n, Y_n)$ |

930

| Node | Node1 | Node2 | Node3 | Node4 | ... | Noden |
|---|---|---|---|---|---|---|
| Node1 | | $d_{12}$ | $d_{13}$ | $d_{14}$ | | $d_{1n}$ |
| Node2 | | | $d_{23}$ | $d_{24}$ | | $d_{2n}$ |
| Node3 | | | | $d_{34}$ | | $d_{3n}$ |
| Node4 | | | | | | $d_{4n}$ |
| ... | | | | | | |
| Noden | | | | | | |

LOCALIZATION APPARATUS FOR RECOGNIZING LOCATION OF NODE IN SENSOR NETWORK AND METHOD THEREOF

CROSS-REFERENCE(S) TO RELATED APPLICATIONS

The present invention claims priority of Korean Patent Application No. 10-2006-0095567, filed on Sep. 29, 2006, which is incorporated herein by reference.

BACKGROUND OF THE INVENTION

1. Field of the Invention

The present invention relates to a localization apparatus for recognizing a location of a node in a sensor network and a method thereof; and, more particularly, to a localization apparatus selectively using neighbor nodes having less obstacle factors and a method thereof.

2. Description of Related Art

Triangulation has been generally used to detect a location of a node in a wireless sensor network. The triangulation uses coordinates and distances of more than three anchor nodes to detect the location of a node. A localization method using triangulation is generally classified into a localization method using information about measured distances and a localization method not using information about measured distances.

In the method using distance information, a location of a target node is detected by measuring distances from more than three known anchor nodes to the target node and performing the triangulation with the measured distances and the location information of the known anchor nodes. A distance between two nodes is measured using a time of arrival (ToA) method, a time difference of arrival (TDoA) method, a received signal strength (RSS) method.

In the ToA method, a distance between two nodes is measured using a time taken by a signal having a known propagation speed to travel between two nodes. In the TDoA method, two signals having different propagation speeds are simultaneously transmitted to two nodes, and a distance between two nodes is measured using the arrival times of two signals. The two methods may provide more accurate measuring results if a signal has a low propagation speed and if no obstacles are present between two nodes. In case of the ToA method, it is impossible to accurately measure a distance if a signal has a fast propagation speed like a radio frequency (RF) signal. In case of the TDoA method, additional hardware or sensors are necessary to measure a distance between two nodes because two signals are used. In addition, it is impossible to obtain accurate distance measuring results if signals having a low propagation speed, such as an ultrasonic wave or a sound wave, are used. That is, it is difficult to secure line of sight (LoS) if an ultrasonic wave or a sound wave is used. Therefore, it is impossible to accurately measure a distance between two nodes due to the influence of obstacles.

In the RSS method, a distance is measure using the strength of a receiving signal arrived at a node. The RSS method uses a radio frequency (RF) signal. Since the RF signal has a better diffraction character than an ultrasonic wave or a sound wave, it is easier to secure line of sight (LoS) and additional hardware is not required. However, the RSS method has a disadvantage of low accuracy compared to other distance measuring methods. Particularly, the measuring result of the RSS method is significantly influenced by obstacles that reflect or absorb the RF signal.

As a localization method not using distance information, a Centroid method and an approximate point in triangulation (APIT) method were introduced. Such methods were developed because the localization method using distance information may diffuse an error in a sensor network having multi-hop. In the Centroid method, regularly arranged anchor nodes transmit the location information thereof to neighbor nodes, and the neighbor nodes estimate own location by comparing strength of signals received from the anchor nodes. The Centroid method may provide more accurate measuring result if the anchor nodes are arranged at a regular distance, if the number of anchor nodes is large, and if the RF propagation environment is identically sustained. However, it is very difficult to satisfy such conditions in a real environment of a sensor network, such as a general indoor place. In the APIT method, a node estimates an own location using whether the node is present in a triangle formed of anchor nodes. Since a node also uses signal strength to estimate own location in the APIT method, the APIT method has disadvantage identical to the Centroid method.

As described above, the localization methods using triangulation according to the related art needs the large number of anchor nodes and nodes to detect own locations to accurately detect a location of a node. If the number of anchor nodes increases, the number of triangles increases too. Therefore, the large amount of computation is required to accurately detect the location.

SUMMARY OF THE INVENTION

An embodiment of the present invention is directed to providing a localization apparatus for accurately detecting a location of a node selectively using neighbor nodes having less obstacle factors in a sensor network, and a method thereof.

Another embodiment of the present invention is directed to providing a localization apparatus for accurately obtaining the location information of a target node with a less number of reference nodes by selectively using reference nodes having less obstacle factors, and a method thereof.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided a method for obtaining location information of a node in a sensor network, including the steps of: a) selecting reference nodes from a plurality of anchor nodes to be used for triangulation; and b) obtaining location information of a target node by performing triangulation using the selected reference node, wherein in the step a), the reference nodes are selected by removing anchor nodes having obstacle factor from a plurality of the anchor nodes where the obstacle factor causes error in a distance measured by the target node.

In accordance with another aspect of the present invention, there is provided a node apparatus for selecting reference nodes for triangulation to obtain location information of a target node, including: a storing unit for storing location information of the node apparatus; a distance measuring unit for measuring a first distance to a neighbor node; and a reference node selecting unit for determining whether the neighbor node is added as a reference node or not, wherein the reference node selecting unit calculates a second distance to the neighbor node using the stored location information and location information of the neighbor node and selects the neighbor node as a reference node to be used for triangulation if a difference of the measured first distance and the calculated second distance is in an allowable error range.

In accordance with another aspect of the present invention, there is provided a node apparatus for obtaining location information of a target node using triangulation in a sensor network, including: a location information obtaining unit for obtaining a target node by performing triangulation using reference nodes selected from neighbor nodes of the target node; and a representative reference node selecting unit for selecting one having a most similar line of sight (LoS) characteristic between the target node and oneself comparing to a LoS characteristic between the target node and the test node from the reference nodes as a representative reference node, wherein the location information obtaining unit adds the test node as a new reference node to be used for triangulation if the selected representative reference node informs the location information obtaining unit that a measured distance between the test node and the representative reference node is in an allowable error range.

BRIEF DESCRIPTION OF THE DRAWINGS

FIG. 9 is a diagram showing the location/distance information table for anchor nodes, which is stored in the sink nodes that obtain location information of a target node in accordance with an embodiment of the present invention.

DESCRIPTION OF SPECIFIC EMBODIMENTS

The advantages, features and aspects of the invention will become apparent from the following description of the embodiments with reference to the accompanying drawings, which is set forth hereinafter. In addition, if it is considered that detailed description on a related art may obscure the points of the present invention, the detailed description will not be provided herein. The preferred embodiments of the present invention will be described in detail hereinafter with reference to the attached drawings.

Figure 1:
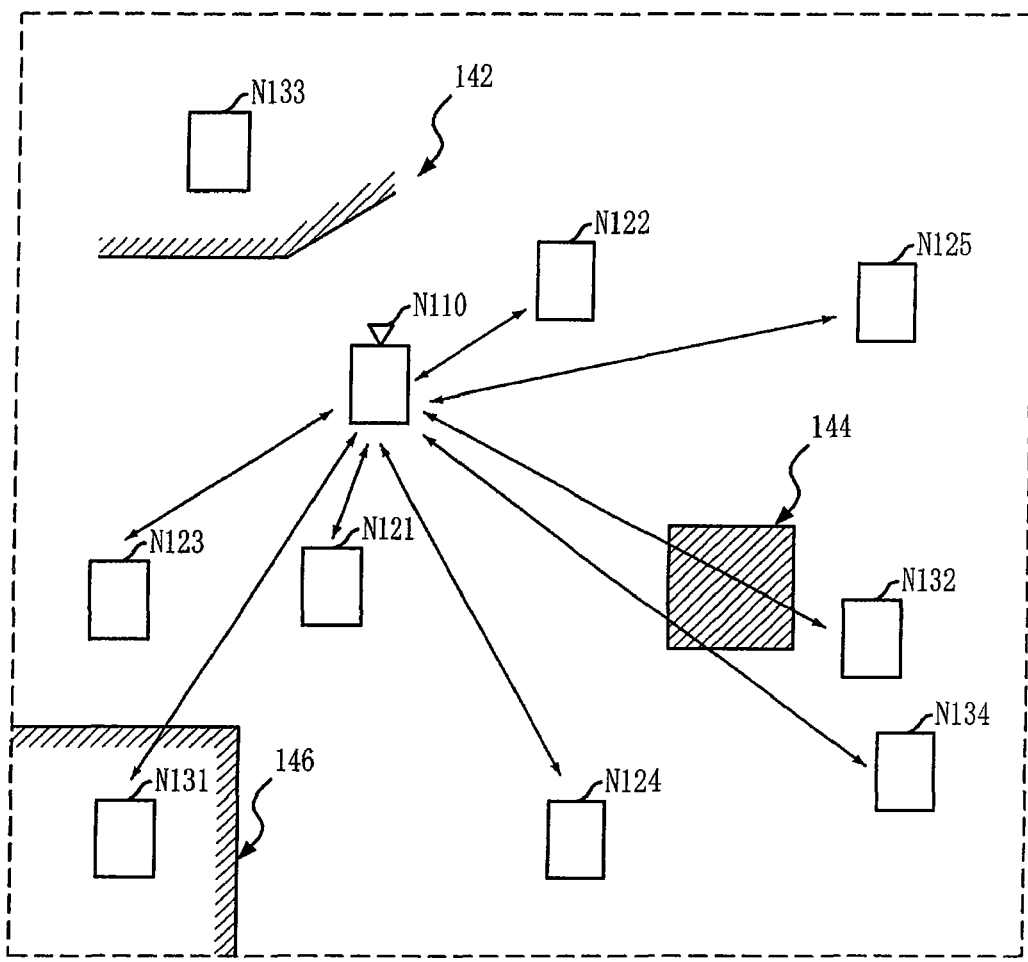
FIG. 1 is a diagram illustrating a sensor network where an embodiment of the present invention is applied.

FIG. 1 is a diagram illustrating a sensor network where an embodiment of the present invention is applied.

As shown in FIG. 1, the sensor network includes a target node N110 and anchor nodes N121 to N125 and N131 to N134. The target node N110 is a node to obtain the location information thereof, and each of the anchor nodes has own location information. Neighbor nodes are anchor nodes located within the communication range of the target node N110 having no location information. The location information is a coordinate mapped at a predetermined rate of real distances as a coordinate on a two dimensional or three dimensional virtual coordinate system which is expressed by a network manager. The target node is a node having no coordinate value on such virtual coordinate system.

If triangulation is applied in the sensor network in FIG. 1, the target node N110 uses all anchor nodes N121 to N125 and N131 to N134 in the communication range of the target node N110 as reference nodes of triangulation. That is, the target node N110 estimates distances to all of anchor nodes N121 to N124 and N131 to N134 in a communication range using a received signal strength (RSS) method or a time of arrival (ToA) method, and triangulation is performed using the estimated distances and the location information of the anchor nodes in typical localization method according to the related art. In an environment having less obstacle factors, the more accurate localization result is generally obtained, the large the number of reference nodes are. However, if an environment includes the obstacle factors 142, 144, and 146 as shown in FIG. 1, the environment includes nodes N131 to N134 have larger distance errors than the other nodes due to the obstacles 142, 144, and 146. Therefore, the error of the triangulation becomes large in this environment. In the present embodiment, the obstacles mean objects, such as walls and buildings, that may reflect or absorb a radio wave to measure a distance, thereby causing errors to measure a distance.

In the present embodiment, the location information of a target node is accurately calculated using a less number of nodes by selecting nodes having less obstacle factors as a reference node for triangulation. The target node N110 tests nodes to select reference nodes. That is, the target node N110 analyzes one node at a time from one having the closest estimated distance. For the test, the target node selects a representative reference not to perform the test on neighbor nodes. The representative reference node is selected from previously selected reference nodes. After the representative reference node is selected, it is tested whether the selected representative reference node can be added as a reference node of a corresponding neighbor node or not. One representative reference node is selected for each of neighbor nodes. Generally, the closer the representative reference node is from the target node, the more the accurate result can be obtained.

Figure 5:
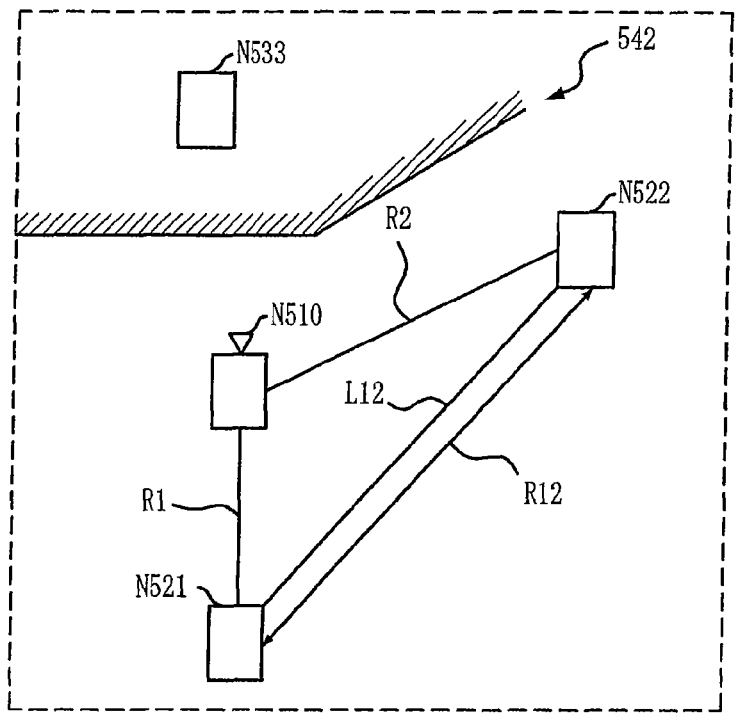
FIG. 5 is a diagram for describing a method for determining whether a neighbor anchor node is added as a reference node or not when the number of initial reference nodes is 1 in accordance with an embodiment of the present invention.
Figure 6:
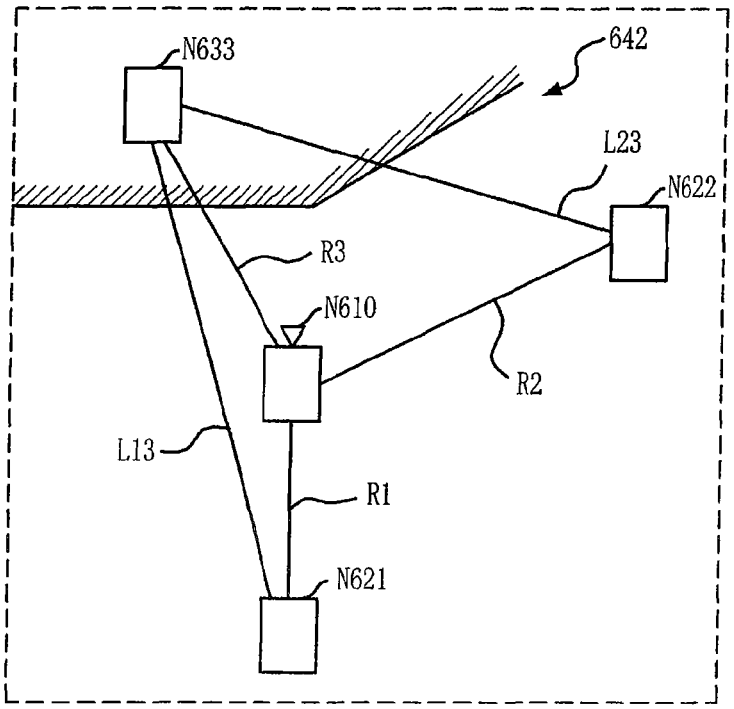
FIG. 6 is a diagram for describing a method for selecting a representative reference node to determine whether each of neighbor nodes is added as a reference node or not if the number of reference nodes is larger than two in accordance with an embodiment of the present invention.
Figures 7, 8:
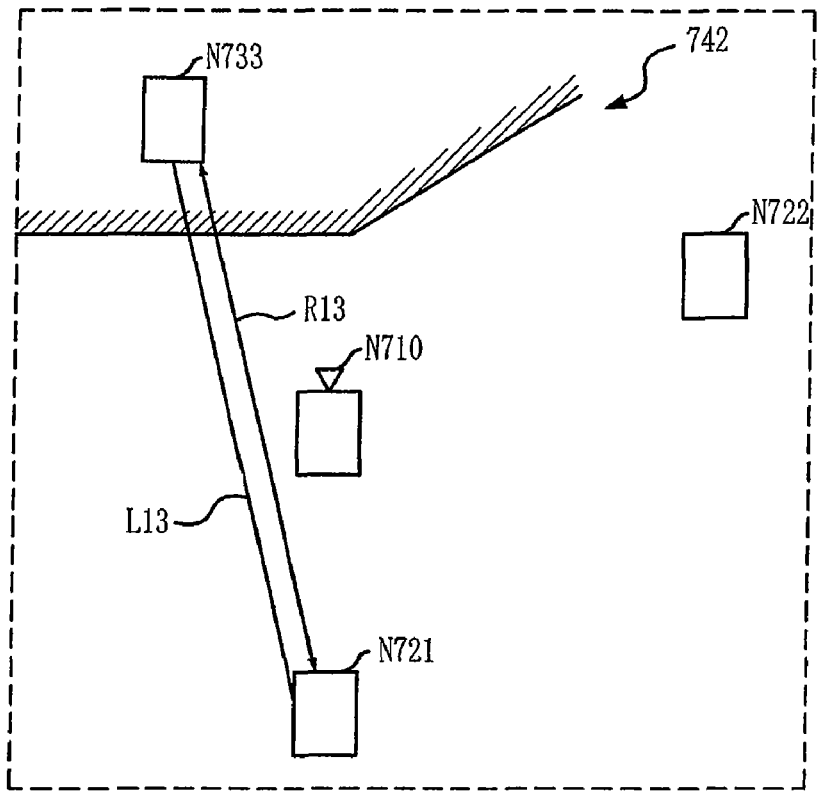
FIG. 7 is a diagram for describing a method for determining whether a test node is added as a reference node or not using a selected representative reference node in accordance with an embodiment of the present invention.
FIG. 8 is a diagram showing a location/distance information table for adjacent nodes, which is stored in anchor nodes in accordance with an embodiment of the present invention.

For such a sequence of processes, the number of initial reference nodes should be decided. The initial reference nodes must be a node having no error caused by obstacles. Also, the more the initial reference nodes are provided, the more the accuracy of the localization is improved. However, since it is impossible to determine whether an error will occur by the obstacle or not in advance, an initial reference node is selected in an order of nodes having the closest estimated distance to the target node N110 in the present embodiment. If too many initial reference nodes are selected, a node having an error by the obstacle may be included. Therefore, it is preferable to select less than three initial reference nodes. FIG. 5 shows an example of selecting one initial reference node, and FIG. 6 and FIG. 7 show an example of selecting more than two initial reference nodes.

Figure 2:
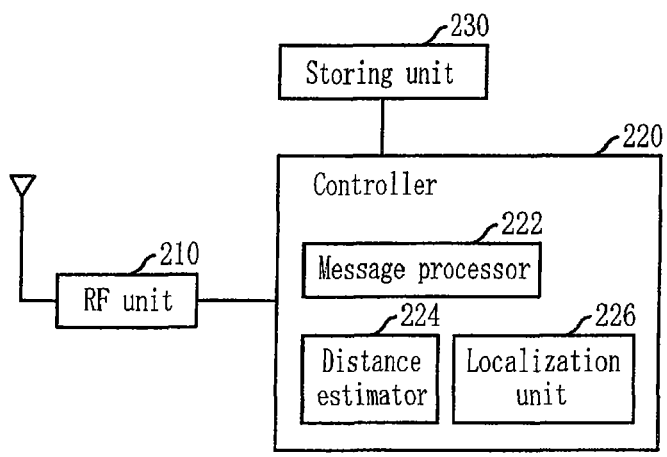
FIG. 2 is a block diagram depicting a target node for localization in accordance with an embodiment of the present invention.

FIG. 2 is a block diagram depicting a target node for localization in accordance with an embodiment of the present invention.

As shown in FIG. 2, the target node includes a radio frequency (RF) unit 210 for communicating with neighbor nodes, a storing unit 230, and a controller 220. The controller 220 includes a message processor 222 for processing messages transmitted to or received from neighbor nodes, a distance estimator 224 for estimating a distance from neighbor nodes, and a localization unit 226 for calculating a location of a node.

The storing unit 230 includes a program memory and a data memory. The program memory stores a program for estimating a distance, a program for determining whether a test node is added as a reference node or not, a program for selecting a representative reference node for a test node from a plurality of reference nodes, and a program for triangulation. The data memory stores information about distances estimated from adjacent nodes and own location information measured by the localization unit 226.

The distance estimator 224 estimates a distance from an adjacent node using a received signal strength (RSS) method or a time of arrival (ToA) method. In case of using the RSS method, the distance estimator 224 estimates a distance from an adjacent node using the received signal strength measured by the RF unit 210.

The localization unit 226 decides a reference node for a test node and selects a representative reference node for a test node if a plurality of reference nodes are provided. Also, the localization node 226 measures a location of a target node by performing triangulation using decided reference nodes after reference nodes are decided for all adjacent nodes.

Figure 3:
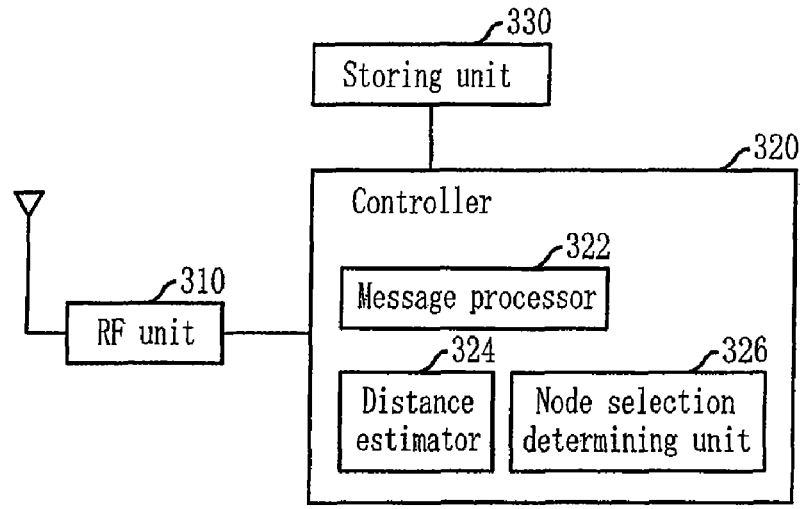
FIG. 3 is a block diagram showing an anchor node in accordance with an embodiment of the present invention.

FIG. 3 is a block diagram showing an anchor node in accordance with an embodiment of the present invention.

As shown in FIG. 3, an anchor node includes a radio frequency (RF) unit 310 for communicating with a test node and a target node, a storing unit 330, and a controller 320. The controller 320 includes a message processor 322 for processing messages transmitted to or received from the test node and the target node, a distance estimator 324 for estimating a distance from a test node, and a node selection determining unit 326 for determining whether a test node is added as a reference node or not.

The storing unit 330 includes a program memory and a data memory. The program memory stores a program for estimating a distance, and a program for determining whether a test node is added as a reference node or not. The data memory stores the location information of adjacent nodes and information about a distance estimated from the adjacent node.

The distance estimator 324 estimates a distance from a test node using an RSS method or a ToA method. In case of the RSS method, the distance estimator 324 estimates a distance from a test node using a received signal strength measured by the RF unit 310.

The node selection determining unit 326 determines whether the difference between the estimated distance and a real distance from the test node is in an allowable error range or not in order to determine a reference node for the test node.

Figure 4:
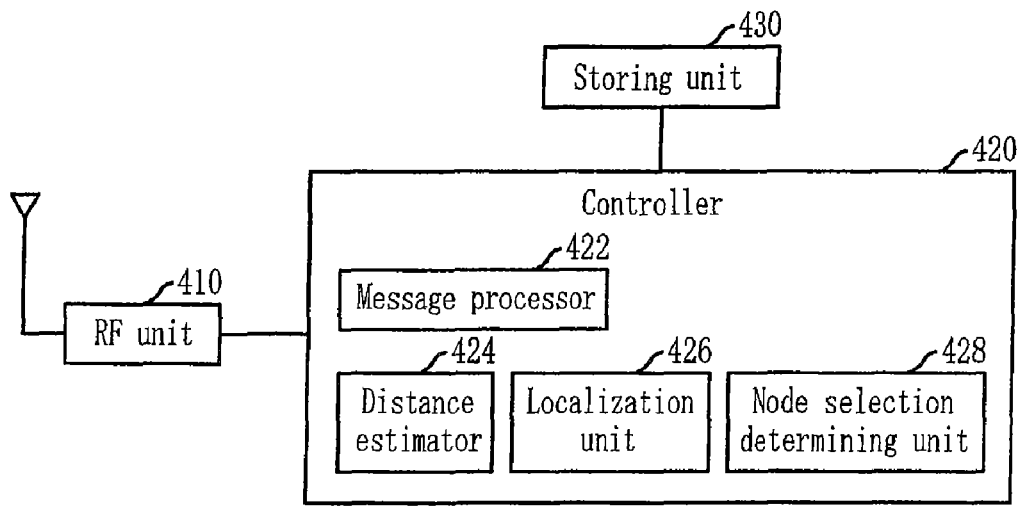
FIG. 4 is a block diagram illustrating an anchor node obtaining location information of a target node in accordance with another embodiment of the present invention.

FIG. 4 is a block diagram illustrating an anchor node obtaining location information of a target node in accordance with another embodiment of the present invention. In the present embodiment, a target node obtains own location information. Such an operation can be performed in a sink node for collecting data from a sensor node and managing the collected data. Particularly, the sink node can operate as an anchor node at the same time if the sink node is a neighbor node for a target node.

As shown in FIG. 4, the sink node includes a radio frequency (RF) unit 410 for communicating with nodes forming a sensor network, a storing unit 430, and a controller 420. The controller 420 includes a message processor 422 for processing messages transmitted to or received from nodes forming a sensor network, a distance estimator 424 for estimating a distance from a neighbor node, and a localization unit 426 for measuring a location of a node.

The storing unit 430 includes a program memory and a data memory. The program memory stores a program for estimating a distance, a program for determining whether a test node is added as a reference node or not, a program for selecting a representative reference node for a test node from a plurality of reference nodes, and a program for triangulation. The data memory stores information about a distance estimated from an adjacent node and location information of a target node, which is measured by the localization unit.

The distance estimator 424 estimates a distance from an adjacent node using an RSS method or a ToA method. In case of the RSS method, the distance estimator 424 uses a received signal strength measured by the RF unit 410 to estimate a distance from an adjacent node.

The localization unit 426 determines a reference node for a test node, and selects a representative node for a test node if a plurality of reference nodes are provided. The localization unit 426 performs triangulation using the decided reference nodes, thereby measuring the location of a target node if reference nodes are decided for all of adjacent nodes.

The node selection determining unit 428 determines a reference node for the test node by determining whether the difference between the estimated distance and a real distance from the test node is in an allowable error range or not.

FIG. 5 is a diagram for describing a method for determining a reference node for a neighbor anchor node when the number of initial reference nodes is 1 in accordance with an embodiment of the present invention.

Referring to FIG. 5, a target node N510 for localization estimates distances to neighbor anchor nodes using an RSS method and selects one N521 having the closest distance from the neighbor anchor nodes as an initial reference node. Then, the target node N510 selects one N522 having the closest distance from the neighbor anchor nodes excepting the initial reference node N521 as a test node.

Since the initial reference node N521 is one, the node N521 becomes a representative reference node for the test node N522. The representative reference node N521 estimates a distance R12 to the test node N522 using the RSS method or the ToA method, and calculates a real distance L12 to the test node N522 using the location information of the test node and own location information. The location information of the test node N522 can be obtained through communicating from the representative reference node N521 to the test node N522. Then, the representative reference node N521 calculates a difference of the estimated distance R12 and the real distance L12, like |R12−L12|. If the difference is larger than the initial allowable error range, the test node N522 is removed from reference nodes. If the difference is smaller than the initial allowable error range, the representative reference node N521 transmits information that the estimated distance for the test node is in the allowable error range and the distance information L12 of the test node to the target node N510. The initial allowable error range can be defined as a function with network environment parameters like 'two times of average distance error with no obstacle in an network environment'.

The target node N510 determines whether the node N522 is added as a reference node or not using a triangle formed by the node N510, the node N521, and the node N522. In the triangle, R1, and R2 denote distances estimated by the target node N510 using the RSS method or the ToA method. L12 is a real distance between the representative reference node N521 and the test node N522. The target node N510 subtracts the longest line from the sum of two lines in the triangle. That is, the target node N510 subtracts the real distance L12 between the representative reference node N521 and the test node N522 from the sum of the estimated distance R1 from the target node N510 to the representative reference node N521 and the estimation distance from the target node N510 to the test node N522. In FIG. 5, it is equivalent to 'R1+R2−L12'. If the result of calculation (R1+R2−L12) is larger than an initial threshold value, the test node N522 is removed from a reference node because it determines that a proper representative reference node is not present to determine a reference of the test node N522. On the contrary, if the result of calculation (R1+R2−L12) is smaller than an initial threshold value, the test node N522 is added as a reference node. In the embodiment of FIG. 5, the node N522 is added as a reference node because the result of calculation (R1+R2−L12) is sufficiently small.

Meanwhile, the target node N510 may use an angle formed of lines R1 and R2 as a reference to determine whether a test node N522 is added as a reference node or not. In this method, it is not proper to add a test node as a reference node if the angle formed of the lines R1 and R2 is 90°. Also, it is not proper to add a test node as a reference node if the angle is close to 0° or 180°. For example, if the angle formed of the lines R1 and R2 is smaller than 90°, a reference of the angle can be set as 'smaller than 30° or 45°'. If the angle formed of the lines R1 and R2 is larger than 90°, a reference of the angle can be set as 'larger than 135° or 150°'. For example, in case that a reference of the angle is set as 'larger than 150°' because the angle formed of the lines R1 and R2 is larger than 90° in FIG. 5, the test node N522 may be added as a reference node if an (R1*cos 60+R2*cos 60)<L12 is satisfied. As described above, it is possible for the target node N510 to determine whether the test node N522 is added as a reference node or not by comparing calculation results with an angle '(R1*cos 60+R2*cos 60)<L12' as well as comparing the distance calculation result (R1+R2−L12) with the initial threshold.

Between two methods for determining whether a test node is added as a reference node, the method of comparing the distance calculation result with the threshold value will be described with following embodiments.

FIG. 6 is a diagram for describing a method for selecting a representative reference node to determine whether each of neighbor nodes is added as a reference node or not if the number of reference nodes is larger than two in accordance with an embodiment of the present invention.

Referring to FIG. 6, if more than two reference nodes are provided, a representative reference node must be selected from a plurality of the reference nodes for determining a reference node for neighbor nodes. In FIG. 6, two reference nodes are provided. One of the two reference nodes N621 and N622 is selected as a representative reference node to determine whether a test node N633 is added as a reference node or not.

In order to select one, the longest line is subtracted from the sum of shorter lines in each of two triangles formed of a test node N633, a target node N610, a first reference node N621 and a second reference node N622, like equations (R1+R3−L13) and (R2+R3−L23). That is, in case of a triangle formed by the test node N633, the target node N610 and the first reference node N621, an estimated distance R3 from the target node N610 to the test node N633 is added with an estimated distance R1 from the target node N610 to the first reference node N633. Then, a real distance L13 from the first reference node N621 to the test node N633 is subtracted from the adding result like an equation (R1+R3−L13). In case of a triangle formed by the test node N633, the target node N610 and the second reference node N622, an estimated distance R3 from the target node N610 to the test node N633 is added with an estimated distance R2 from the target node N610 to the second reference node N622. Then, a real distance L23 from the first reference node N621 to the test node N633 is subtracted from the adding result like an equation (R2+R3−L23).

Herein, R1, R2, and R3 are the distances estimated by the target node N610 using the RSS method or the ToA method. L13 and L23 are real distances calculated at the first reference node N621 and the second reference node N622.

In the triangle, the smaller the subtracting result (sum of two short lines−longest line) is, the more the LoS characteristic between a reference node and a test node and the Los characteristic between a target node and a test node are. Therefore, a reference node forming a triangle with smaller subtracting result (sum of two short lines−longest line) is selected as a representative reference node for a test node. It is determined whether obstacles are present between a test node and a target node or not according to whether obstacles are present between the test node and a representative reference node. In an embodiment of FIG. 6, the reference node N621 is selected as a representative reference node for the test node N633 because the result of R1+R3−L13 is smaller than the result of R2+R3−L23.

FIG. 7 is a diagram for describing a method for determining whether a test node is added as a reference node or not using a selected representative reference node in accordance with an embodiment of the present invention.

In an embodiment of the present invention, it is determined whether obstacles are present between a test node and a target node or not according to whether obstacles are present between the test node and a representative reference node. Also, it is determined whether the test node is added as a reference node or not by determining whether obstacles are present between the representative reference node and the test node.

Referring to FIG. 7, a representative reference node N721 estimates a distance R13 to a test node N733 using the RSS method or the ToA method. The representative reference node N721 calculates a real distance L13 between the representative reference node N721 and the test node N733 using its own location information and the location information of the test node N733. The representative reference node N721 compares the difference of the estimated distance R13 and the real distance L13 (|R13−L13|) with an initial error range and removes the test node N733 from a reference node if the difference is larger than the error range. On the contrary, if the difference is smaller than the error range, the representative reference node N721 transmits information that the estimated distance is in the initial error range and information about the distance L13 to a target node N710. The initial error range can be defined as a function with network environment parameters like 'two times of an average distance error with no obstacles in a network environment.' In the embodiment of FIG. 7, the difference |R13−L13| exceeds the initial allowable error range because obstacles are present between the representative reference node N721 and the test node N733. Therefore, the test node N733 is not added as a reference node.

In case of applying the localization apparatus for recognizing the location of the node in the sensor according to the embodiment of the present invention in the sensor network shown in FIG. 1, only anchor nodes N121 to N125 not having obstacle factors are selected as reference nodes. Therefore, the target node N110 can obtain accurate location information by performing triangulation using only the anchor nodes N121 to N125 as the reference nodes and not the anchor nodes N131 to N134 having obstacle factors. That is, the localization apparatus for recognizing the location of the node in the sensor network according to the present embodiment can more accurately calculate the location information than the conventional apparatus because the triangulation is performed without using anchor nodes having large distance estimation errors.

FIG. 8 is a diagram showing a location/distance information table for adjacent nodes, which is stored in anchor nodes in accordance with an embodiment of the present invention.

In the present embodiment, an anchor node stores distances to adjacent nodes in a table formation as shown in FIG. 8 in order to determine whether an adjacent node is added as a reference node or not. Also, the anchor node obtains location information from adjacent nodes through short range wireless communication to calculate real distances to adjacent nodes and stores the obtained location information in a table formation as shown in FIG. 8.

FIG. 9 is a diagram showing a location/distance information table for anchor nodes, which is stored in sink nodes that obtain location information of a target node in accordance with an embodiment of the present invention.

Although a target node obtains own location information in the present embodiment, such an operation can be performed by a sink node that collects and manages data from a sensor node. Particularly, the sink node can perform the function of an anchor node at the same time if the sink node is a neighbor node of the target node.

In order to calculate a distance to an anchor node, the sink node stores the location information of each anchor node in a table formation as shown in FIG. 9. Also, the sink node stores distances to each anchor nodes in a table formation as shown in FIG. 9 in order to determine whether an anchor node is added as a reference node or not.

Figure 10:
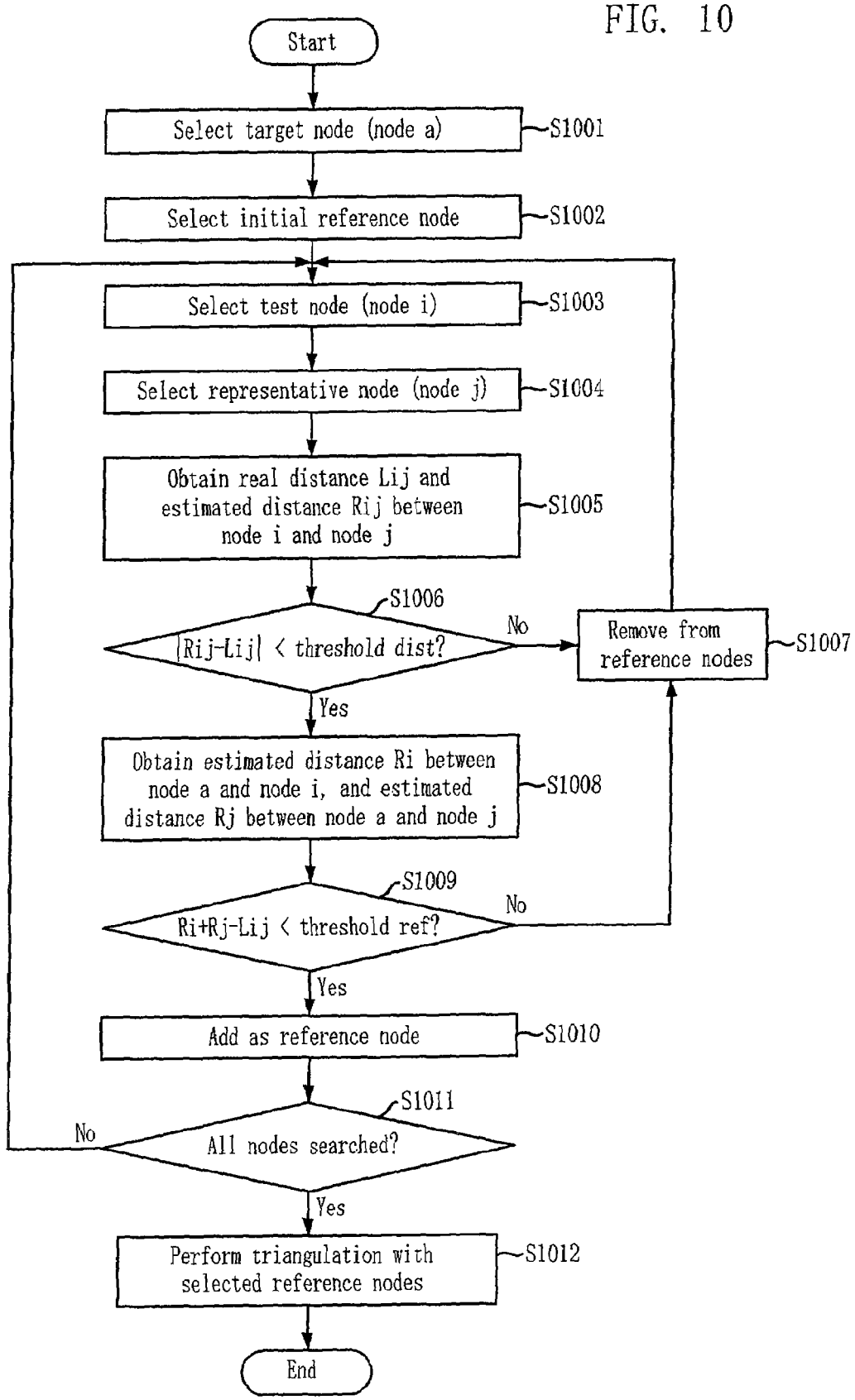
FIG. 10 is a flowchart describing a localization method in accordance with an embodiment of the present invention.

FIG. 10 is a flowchart describing a localization method in accordance with an embodiment of the present invention.

Referring to FIG. 10, when a target node NODEa for localization is selected at step S1001, the target node selects one having the closest estimated distance from anchor nodes as an initial reference node at step S1002.

Except the selected anchor node, the target node selects one having the closest estimated distance from remained anchor nodes as a test node NODEi at step S1003. Then, a representative reference node NODEj is selected to determine whether the test node is added as a reference node or not at step S1004. If a plurality of reference nodes are provided, one of the reference nodes must be selected as a representative reference node. In this case, as a representative reference node, a reference node having an LoS characteristic between the reference node and the test node closest to the LoS characteristic between the target node and the test node is selected.

The representative reference node estimates a distance from the test node Rij using the RSS method or the ToA method, and obtains the real distance Lij from the test node using own coordinate value and the a coordinate value of the test node. The representative reference node calculates the difference of the estimated distance and the real distance |Rij−Lij| using the obtained distance information and determines whether the calculated difference is in an allowable error range or not at step S1006. If the calculated difference is not in the allowable error range, the test node is not added as a reference node. Then, a new test node is selected and the step S1003 is performed at step S1007. On the contrary, if the calculated different is in the allowable error range, the representative reference node transmits information that the calculated difference is in the allowable error range and the distance information Lij to the target node.

The target node estimates distances Ri and Rj to the initial reference node and the test node using the RSS method or the ToA method at step S1008. Then, the target node calculates an equation |Ri+Rj−Lij| and determines whether the result thereof is not satisfied with a threshold value or not at step S1009. If the result is not satisfied with the threshold value, the test node is not added as a reference node. Then, a new test node is selected and the step S1003 is performed at step S1007. On the contrary, if the result is satisfied with the threshold value, the target node adds the test node as a reference node at step S1010.

After all of neighbor anchor nodes are tested by performing the steps repeatedly, accurate location information is obtained by performing the triangulation using the selected reference nodes at step S1012.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

While the present invention has been described with respect to certain preferred embodiments, it will be apparent to those skilled in the art that various changes and modifications may be made without departing from the spirits and scope of the invention as defined in the following claims.

As described above, a localization apparatus for recognizing a location of a node in a sensor network and a method thereof according to embodiments of the present invention can accurately recognize the location of a node by performing triangulation with nodes having a few obstacle factors in a sensor network.

Also, the localization apparatus and method according to embodiments of the present invention can accurately obtain the location information of a node with a few reference nodes by selectively using reference nodes having a few obstacle factors using the line of sight (LoS) characteristic between nodes.

What is claimed is:

1. A method for obtaining location information of a target node in a sensor network, the method comprising:
   selecting reference nodes from a plurality of anchor nodes to be used for triangulation; and
   obtaining location information of the target node by performing triangulation using the selected reference nodes,
   wherein the selecting of the reference nodes comprises:
   selecting a test node from the plurality of anchor nodes;
   selecting a representative reference node for determining whether or not the selected test node is added as a reference node;
   calculating a first distance between the test node and the representative reference node using location information of the test node and the representative reference node;

measuring a second distance between the test node and the representative reference node; and adding the test node as a reference node if a difference of the first distance and the second distance is in an allowable error range, and wherein the representative reference node is a reference node that forms, together with the target node and the test node, a triangle having the smallest result of subtracting a longest line from a sum of shorter lines of the triangle among triangles formed of a plurality of previously selected reference nodes, the test node, and the target node.

2. The method of claim 1, wherein the second distance between the test node and the representative node is measured using a received signal strength (RSS) method.

3. The method of claim 1, wherein the representative reference node includes a reference node having a first short line corresponding to a measured distance between the target node and said reference node and a second short line corresponding to a measured distance between the target node and the test node, and a longest line corresponding to a calculated distance between said reference node and the test node, which is calculated using location information of said reference node and the test node.

4. The method of claim 3, wherein the measured distance between the target node and the reference node and the measured distance between the target node and the test node are measured using a received signal strength (RSS) method.

5. The method of claim 1, wherein the selecting of the reference nodes further includes selecting an anchor node having a closest calculated distance from the target node from among the plurality of anchor nodes as an initial reference node.

6. The method of claim 1, wherein in the adding the test node, the test node is not added as a reference node if a result of subtracting the first distance from a sum of a measured distance between the target node and the representative reference node and a measured distance between the target node and the test node is larger than a threshold value.

7. A node apparatus configured to select reference nodes for triangulation to obtain location information of a target node, the apparatus comprising:

a storing unit configured to store location information of the node apparatus;

a distance measuring unit configured to measure a first distance to a neighbor node from the node apparatus; and a reference node selecting unit configured to determine whether the neighbor node is added as a reference node or not, wherein the reference node selecting unit calculates a second distance to the neighbor node from the node apparatus using the stored location information and location information of the neighbor node and selects the neighbor node as a reference node to be used for triangulation if a difference of the measured first distance and the calculated second distance is in an allowable error range that is a value equivalent to approximately two times an average error of measured distances measured in an environment having no obstacle between the target node and the neighbor node.

8. The node apparatus of claim 7, wherein the distance measuring unit uses a received signal strength (RSS) method to measure the first distance.

9. The node apparatus of claim 7, further comprising:

a transmitting unit configured to transmit the calculated second distance to the target node if the neighbor node is selected as the reference for triangulation.

10. A node apparatus for obtaining location information of a target node using triangulation in a sensor network, comprising:

a location information obtaining unit configured to obtain the location information of the target node by performing triangulation using reference nodes selected from neighbor nodes of the target node; and a representative reference node selecting unit configured to select a reference node having a line of sight (LoS) characteristic between a test node and said reference node that is the closest to a LoS characteristic between the target node and the test node, among the reference nodes, as a representative reference node, the test node being selected from the neighbor nodes, wherein the location information obtaining unit adds the test node as a new reference node to be used for triangulation if the selected representative reference node informs the location information obtaining unit that a measured distance between the test node and the representative reference node is in an allowable error range.

11. The node apparatus of claim 10, wherein the representative reference node selecting unit selects a reference node having a smallest result of subtracting a third distance between the test node and said reference node from a sum of a first measured distance between the target node and said reference node and a second measured distance between the target node and the test node as the representative reference node.

12. The node apparatus of claim 11, wherein the third distance between the test node and the reference node is calculated using location information of the test node and the reference node.

13. The node apparatus of claim 12, wherein the first measured distance between the target node and the reference node and the second measured distance between the target node and the test node are calculated using a received signal strength (RSS) method.

* * * * *